US007196723B2

(12) United States Patent
Kinoshita et al.

(10) Patent No.: US 7,196,723 B2
(45) Date of Patent: Mar. 27, 2007

(54) STREAK APPARATUS WITH FOCUS

(75) Inventors: Katsuyuki Kinoshita, Hamamatsu (JP); Yoshinori Inagaki, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 555 days.

(21) Appl. No.: 10/169,861

(22) PCT Filed: Jan. 11, 2001

(86) PCT No.: PCT/JP01/00091

§ 371 (c)(1),
(2), (4) Date: Jul. 10, 2002

(87) PCT Pub. No.: WO01/52300

PCT Pub. Date: Jul. 19, 2001

(65) Prior Publication Data

US 2003/0001496 A1 Jan. 2, 2003

(30) Foreign Application Priority Data

Jan. 12, 2000 (JP) .......................... P2000-003781

(51) Int. Cl.
*H04N 5/225* (2006.01)

(52) U.S. Cl. .................................................. 348/215.1

(58) Field of Classification Search ..................... None
See application file for complete search history.

(56) References Cited

U.S. PATENT DOCUMENTS 4,350,919 A * 9/1982 Johnson et al. ............. 313/529
4,999,548 A * 3/1991 Bourcier et al. ............ 315/370
5,095,243 A * 3/1992 Kinoshita et al. ........... 313/376
5,101,100 A * 3/1992 Kinoshita et al. ...... 250/214 VT
5,196,732 A * 3/1993 Takahashi et al. .......... 327/126
5,278,403 A * 1/1994 Alfano et al. ......... 250/214 VT
5,579,103 A * 11/1996 Tachikawa .................. 356/5.1

FOREIGN PATENT DOCUMENTS

| | | |
|---|---|---|
| EP | 0 424 148 A2 | 4/1991 |
| FR | 2 536 871 | 6/1984 |
| GB | 2 133 611 | 7/1984 |
| JP | 59191243 | 10/1984 |
| JP | 59191244 | 10/1984 |
| JP | 59194334 | 11/1984 |
| JP | 63-6424 | 1/1988 |
| JP | 02239554 | 9/1990 |
| JP | 4-73257 | 11/1992 |

* cited by examiner

*Primary Examiner*—Ngoc-yen Vu
*Assistant Examiner*—Hung Lam
(74) *Attorney, Agent, or Firm*—Drinker Biddle & Reath LLP

(57) ABSTRACT

In a streak apparatus including a streak tube 1 having a vacuum container 1*a* which has a photocathode 3 at its one end and an output surface 6 at its other end, an accelerating electrode 4 for accelerating photoelectrons, a deflecting electrode 5 formed of a pair of electrodes, and a plurality of focusing magnetic flux generators 12*a* and 12*b* for focusing the photoelectrons emitted from the photocathode 3, a deflecting voltage generation circuit 10, an acceleration voltage generation circuit 9, and drive power supplies 13*a* and 13*b* for supplying a current to the focusing magnetic flux generators, the plurality of focusing magnetic flux generators 12*a* and 12*b* form a main focusing electron lens for forming an electron image, formed on the photocathode 3, on the output surface, and a prefocus lens arranged between the photocathode and main focusing electron lens to focus the photoelectrons, emitted from the photocathode 3, toward the center of the main focusing electron lens.

19 Claims, 12 Drawing Sheets

STREAK APPARATUS WITH FOCUS

TECHNICAL FIELD

The present invention relates to a streak apparatus suitable for, e.g., measurement of the intensity distribution of a light-emitting phenomenon over time.

BACKGROUND ART

A streak camera is an apparatus having a camera for image-sensing the output surface of a streak tube. A streak apparatus having a streak tube is an apparatus for converting the intensity distribution of measurement target light over time into a spatial intensity distribution on an output surface. For example, Japanese Patent Publication No. 4-73257 discloses an electromagnetic focusing streak apparatus. This streak apparatus has a single focusing magnetic flux generator (electromagnetic focusing coil). The focusing magnetic flux generator generates a focusing magnetic flux in only a space between a photocathode and the input of a deflecting electrode from the outside of a streak tube, to substantially focus photoelectrons emitted from the photocathode.

DISCLOSURE OF INVENTION

The streak apparatus described above has only one focusing magnetic flux generator. When a large effective range in the space domain is reserved on the photocathode, the electron group of the photoelectrons emitted from the end of the photocathode undesirably pass through a portion around an electron lens formed by the focusing magnetic flux generator. Then, the space resolution and time resolution are degraded, and space distortion increases. Since the distance from the center of the focusing electron lens to the output surface is larger than that from the photocathode to the center of the focusing electron lens, it is difficult to widen the effective range in the space domain on the photocathode.

U.S. Pat. No. 4,350,919 discloses an electromagnetic focusing streak apparatus having two focusing magnetic flux generators. In this streak apparatus, since focusing magnetic fields generated by the focusing magnetic flux generators and a deflecting electric field generated by a sweep deflecting electrode overlap in the direction of tube axis of the streak tube, photoelectron beams move cycloidally in the sweep deflecting electrode. Therefore, a large effective range in the space domain cannot be reserved on the photocathode. Since the photoelectron beams are adversely affected by the focusing magnetic fields, a sufficiently high deflection sensitivity cannot be obtained. Also, the two focusing magnetic field generators of the streak apparatus are not arranged such that photoelectrons emitted from the end of the photocathode pass through a portion in the vicinity of the center of an electron lens which forms an electron image, formed on the photocathode, on the output surface. Therefore, the space resolution and time resolution at the end of the photocathode are degraded, and space distortion increases.

An electrostatic focusing streak apparatus is advantageous in that it can have a large effective range on the photocathode. However, since the potential of a focusing electrode for forming a focusing electron lens is low, electron beams are diffused by the space charge effect, and the dynamic range (D-range) narrows down.

The present invention has been made in view of the above situation, and has as its object to provide a streak apparatus in which a large effective range can be reserved on a photocathode, and high space resolution and high time resolution, small space distortion, and a large dynamic range (D-range) can be obtained in the effective range.

According to the first streak apparatus, in a streak apparatus comprising a streak tube having a vacuum container which has, at one end thereof, a photocathode for converting a received light beam into photoelectrons and, at the other end thereof, an output surface for converting an image formed by the photoelectrons into a visible optical image, an accelerating electrode arranged to oppose the photocathode along a tube axis of the vacuum container and to accelerate the photoelectrons emitted from the photocathode, a deflecting electrode formed of a pair of electrodes opposing each other between the accelerating electrode and the output surface to sandwich the tube axis, and a plurality of focusing magnetic flux generators for generating a focusing magnetic flux between the photocathode and an incident port of the deflecting electrode to focus the photoelectrons emitted from the photocathode, a deflecting voltage generation circuit for supplying a voltage to the deflecting electrode so as to generate a deflecting electric field, an acceleration voltage generation circuit for supplying a voltage to the accelerating electrode, and a drive power supply for supplying a current to the focusing magnetic flux generators, an arrangement is employed in which the plurality of focusing magnetic flux generators form a main focusing electron lens for forming an electron image, formed on the photocathode, on the output surface, and a prefocus lens arranged between the photocathode and the main focusing electron lens to focus the photoelectrons, emitted from the photocathode, toward a center of the main focusing electron lens.

With this arrangement, a photoelectron beam emitted from the photocathode at the end of its effective range in the space domain is bent by the prefocus lens and travels toward the center of the main focusing electron lens. Since the main focusing electron lens has a small spherical aberration at its center, a spot image with a small blur can be obtained on the output surface. As a result, a good space resolution can be obtained in both the time domain and space domain.

According to the second streak apparatus, in a streak apparatus comprising a streak tube having a vacuum container which has, at one end thereof, a photocathode for converting received light into photoelectrons and, at the other end thereof, an output surface for converting an image formed by the photoelectrons into a visible optical image, an accelerating electrode arranged to oppose the photocathode along a tube axis of the vacuum container and to accelerate the photoelectrons emitted from the photocathode, a deflecting electrode formed of a pair of electrodes opposing each other between the accelerating electrode and the output surface to sandwich the tube axis, and a plurality of focusing magnetic flux generators including a permanent magnet and serving to generate a magnetic flux, by the permanent magnet, between the photocathode and an incident port of the deflecting electrode to focus the photoelectrons emitted from the photocathode, a deflecting voltage generation circuit for supplying a voltage to the deflecting electrode so as to generate a deflecting electric field, and an acceleration voltage generation circuit for supplying a voltage to the accelerating electrode, an arrangement is employed in which the plurality of focusing magnetic flux generators form a main focusing electron lens for forming an electron image, formed on the photocathode, on the output surface, and a prefocus lens arranged between the photocathode and the main focusing electron lens to focus the photoelectrons, emitted from the photocathode, toward a center of the main focusing electron lens.

In this manner, the focusing magnetic flux generators can be formed by using the permanent magnet. Therefore, a photoelectron beam emitted from the photocathode at the end of its effective range in the space domain is bent by the prefocus lens and-travels toward the center of the main focusing electron lens. Since the main focusing electron lens has a small spherical aberration at its center, a spot image with a small blur can be obtained on the output surface. As a result, a good space resolution can be obtained in both the time domain and space domain.

According to the third streak apparatus, in the first or second apparatus, an arrangement is employed in which a distance between the center of the main focusing electron lens and the output surface is set to be smaller than a distance between the photocathode and the center of the main focusing electron lens.

In this manner, since the main focusing electron lens is arranged at a portion closer to the output side than the center of the streak tube, the distance from a portion where the photoelectron density becomes maximum to an output sweep surface becomes small. Even when the Coulomb repulsive force caused by a space charge effect works at the maximum-density portion, the degree of diffusion of photoelectron beams caused by it can be small. As a result, D-range degradation can be decreased.

According to the fourth streak apparatus, in any one of the first to third apparatuses, an arrangement is employed in which each of the focusing magnetic flux generators has a coil arranged to surround the vacuum container and having a central axis coinciding with the tube axis, a magnetic body for shielding the coil, and an aperture formed in the magnetic body on a vacuum container side.

With this arrangement, the range where the magnetic field generated by the focusing magnetic flux generator acts can be limited to only within a necessary range, so the peak intensity can attenuate fast to reach a level where penetration of the magnetic field into the deflecting electrode portion can be neglected. As a result, the magnetic field can be prevented from reaching the deflecting electrode to degrade the deflection sensitivity or rotate the photoelectron beam in the deflecting electrode.

According to the fifth streak apparatus, in any one of the first to fourth apparatuses, an arrangement is employed in which the streak tube has a first focusing magnetic flux generator for forming the main focusing electron lens, and a second focusing magnetic flux generator for forming the prefocus lens.

With this arrangement, a photoelectron beam emitted from the photocathode at the end of its effective range in the space domain is bent by the prefocus lens and travels toward the center of the main focusing electron lens. Since the main focusing electron lens has a small spherical aberration at its center, a spot image with a small blur can be obtained on the output surface. As a result, a good space resolution can be obtained in both the time domain and space domain.

According to the sixth streak apparatus, in the first to fifth apparatuses, an arrangement is employed in which the streak tube has a shielding plate arranged in the vicinity of the incident port of the deflecting electrode to shield an electric field leaking from the deflecting electrode and to have an aperture about the tube axis as a center, the shielding plate having a potential set to not more than a potential of the accelerating electrode.

With this arrangement, a strong electric field generated when a sweep voltage is applied to a deflecting plate can be prevented from leaking to the outside. A decrease in time resolution or the like, which occurs when a leakage electric field influences the main focusing magnetic flux region as well, can be prevented. When the potential at a portion extending from the shielding plate to the output surface is further decreased, the deflection sensitivity can be improved.

According to the seventh streak apparatus, in the sixth apparatus, an arrangement is employed in which the streak tube further has a flange arranged at a middle portion between two adjacent focusing magnetic flux generators to support the shielding plate and to be electrically connected to the shielding plate.

In this manner, since the flange is provided at the middle portion between the two adjacent focusing magnetic flux generators, the flange as a ferromagnetic body can be prevented as much as possible from disturbing the focusing magnetic field to cause degradation in resolution or distortion.

According to the eighth streak apparatus, in any one of the first to seventh apparatuses, an arrangement is employed in which the streak tube further has a gate electrode between the photocathode and the accelerating electrode to have an aperture about the tube axis as a center.

With this arrangement, control operation can be performed such that, for example, during streak sweep, a voltage of +200 V is applied to the photocathode, and before and after sweep, a voltage of −50 V is applied to the photocathode. Thus, while sweep is not being performed, even if light becomes incident on the photocathode, an unnecessary output image can be prevented from being formed, and an increase in background can be decreased.

BEST MODE OF CARRYING OUT THE INVENTION (First Embodiment)

Figure 1:
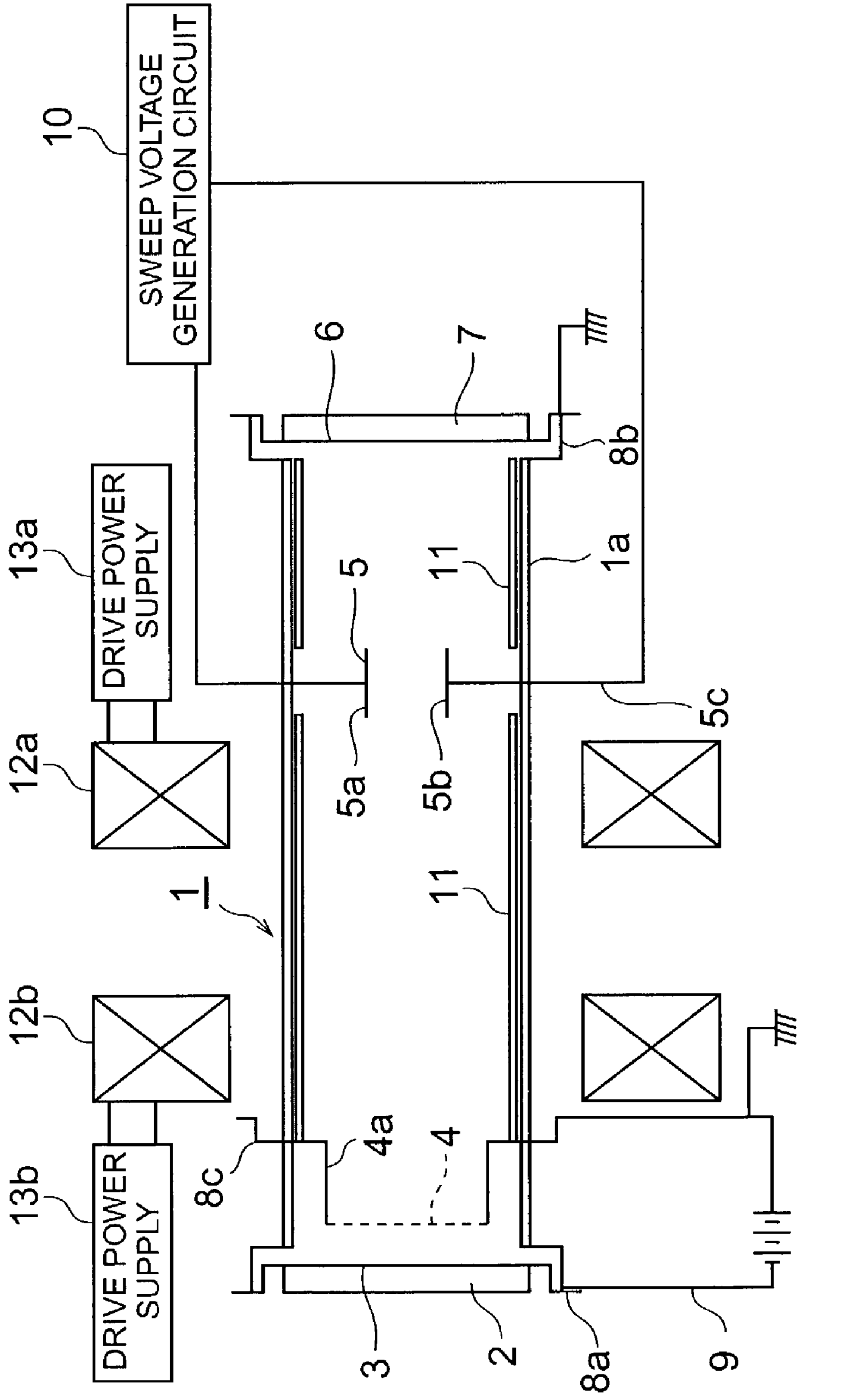
FIG. 1 is a view showing the arrangement of a streak apparatus according to the first embodiment of the present invention.

FIG. 1 is a view of the arrangement of a streak apparatus showing a streak apparatus according to the first embodiment of the present invention together with its schematic sectional arrangement.

A streak tube 1 has a cylindrical glass tube 1*a* as an envelope. The interior of the glass tube 1*a* is maintained at high vacuum. An input window 2 on which target measurement light becomes incident is formed on one end of the glass tube 1*a*, and a photoelectric surface (photocathode) 3 for converting the light into a photoelectric beam is formed on the inner surface of the input window 2. An accelerating electrode 4 formed of a mesh and for accelerating the photoelectron beam and directing it toward the output side, a deflecting electrode 5 for sweeping photoelectrons on the output surface, a phosphor screen (fluorescent material) 6 for converting the electrons into fluorescence in response to bombardment of the incident photoelectrons, and an output window 7 which has the fluorescent material 6 attached thereto and closes the other end of the glass tube 1*a* are formed between one and the other end of the glass tube 1*a* sequentially from this one end side.

The photocathode 3 is electrically connected to a metal flange 8*a* which fuses the input window 2. Similarly, the fluorescent material 6 is electrically connected to a metal flange 8*b* which fuses the output window. The accelerating electrode 4 is supported by a cylindrical electrode 4*a* and is electrically connected to a metal flange 8*c* through the cylindrical electrode 4*a*. Deflecting plates 5*a* and 5*b* of the deflecting electrode 5 are electrically connected to metal deflecting leads 5*c* buried in the wall of the glass tube 1*a*.

The photocathode 3 and accelerating electrode 4 are connected to an acceleration voltage generation circuit 9 which applies an acceleration voltage through the metal flanges 8*a* and 8*b* electrically connected to the photocathode 3 and accelerating electrode 4. According to the first embodiment, a ground potential is applied to the accelerating electrode 4, and −10 kV is applied to the photocathode 3. The metal flange 8*b* to which the fluorescent material 6 is connected is connected to the ground potential.

Figure 2A:
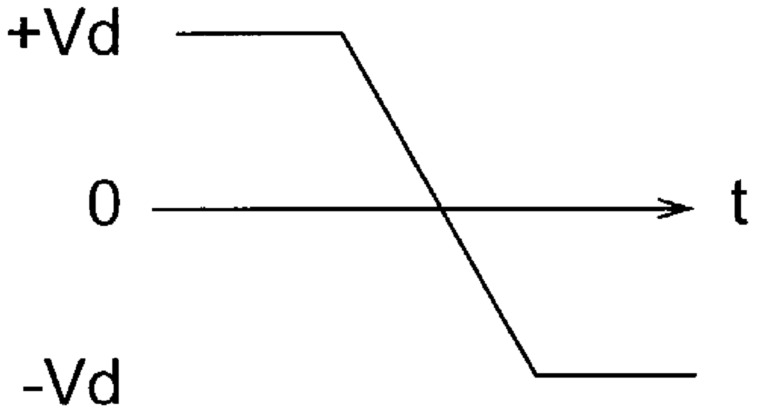
FIG. 2A is a graph sowing a voltage to be applied to a deflecting plate 5*a* during sweep operation.
Figure 2B:
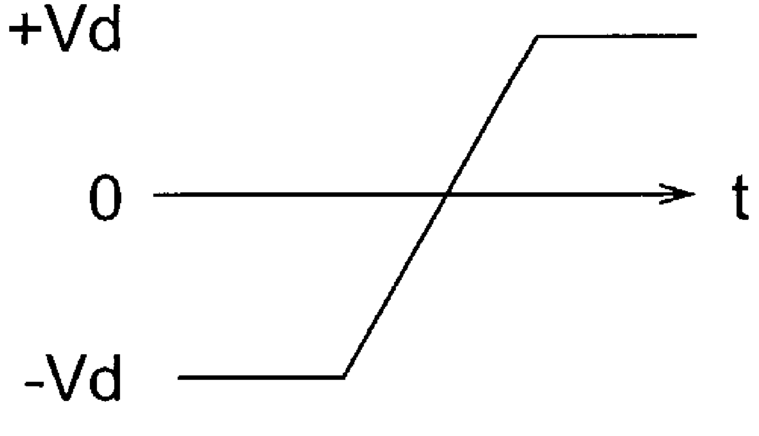
FIG. 2B is a graph showing a voltage to be applied to a deflecting plate 5*b* during sweep operation.

The deflecting leads 5*c* for applying a sweep voltage to the deflecting electrode 5 are connected to a sweep voltage generation circuit 10. During sweep operation, sweep voltages shown in FIGS. 2A and 2B, which change over time obliquely between 1 and 2 kvp-p, are respectively applied to the deflecting plates 5*a* and 5*b*.

According to the first embodiment, a multi alkali photocathode for visible light is used as the photocathode 3. The distance from the photocathode 3 to the accelerating electrode 4 is 5 mm, and the accelerating electrode 4 has a coarseness of 1,000 meshes/inch. Between the accelerating electrode 4 and fluorescent material 6, aluminum is deposited on the inner wall of the glass tube 1*a* to form a wall anode 11, thereby preventing charging. Note that near the bases of the metal leads 5*c*, the wall anode 11 and metal leads 5*c* are electrically insulated from each other without depositing aluminum. The distance from the photocathode 3 to the fluorescent material 6 is 250 mm.

Around the streak tube 1 and between the accelerating electrode 4 and deflecting electrode 5, two focusing magnetic flux generators, i.e., a first focusing magnetic flux generator 12*a* and a second focusing magnetic flux generator 12*b*, are arranged along the tube axis from the fluorescent material 6 side. The focusing magnetic flux generators 12*a* and 12*b* are formed of coils with central axes coinciding with the tube axis. The respective coils are connected to drive power supplies 13*a* and 13*b* for supplying a current.

The first focusing magnetic flux generator 12*a* is arranged such that, regarding its position in the direction of the tube axis, the ratio of the distance from the photocathode 3 to the center the first focusing magnetic flux generator 12*a* to the distance from the center of the first focusing magnetic flux generator 12*a* to the fluorescent material 6 is almost 1.5:1.

With the streak apparatus according to the first embodiment of the present invention, (1) a large effective area can be reserved on the photocathode, and good space resolution and time resolution can be obtained throughout the effective range. At the same time, (2) a high D-range is obtained in the sweep operation of resolving in time. These points can be understood from the trajectories of the photoelectron beams emitted from the photocathode 3. Item (1) will be described first.

Figure 3A:
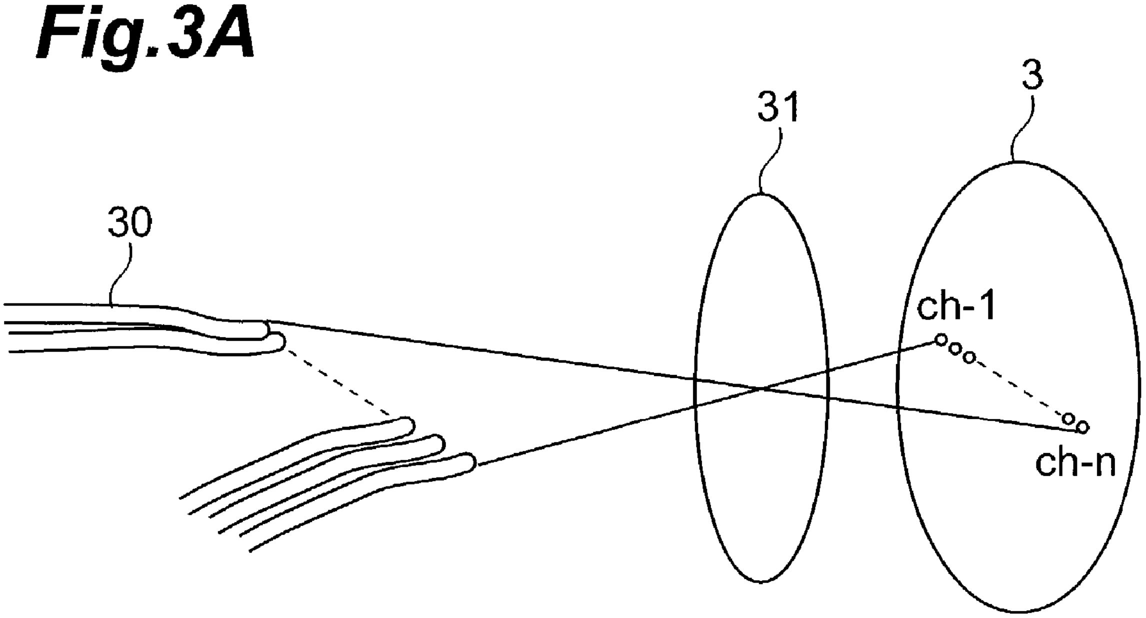
FIG. 3A is a view showing inputs from multi-channel fibers.
Figure 3B:
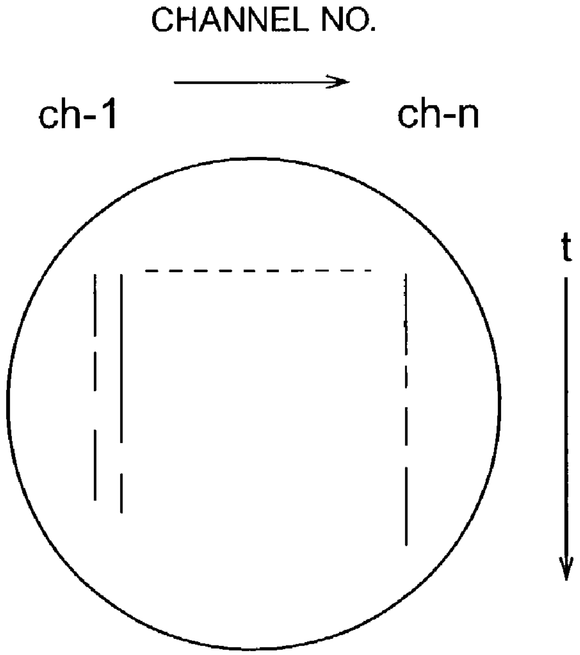
FIG. 3B is a view showing a streak image on an output surface.

FIG. 3A is a view showing inputs from multi-channel fibers, and FIG. 3B is a view showing a streak image on the output surface. For example, in multi-channel simultaneous time resolution photometry, as shown in FIG. 3A, light beams from a large number of channel fibers 30 form an image on a straight line, extending through the center on the photocathode 3, through a lens 31. Photoelectron beams emitted from fine spots corresponding to the respective channels are swept by the deflecting electrode 5 to obtain a streak image on the output surface (fluorescent material 6).

Figure 4A:
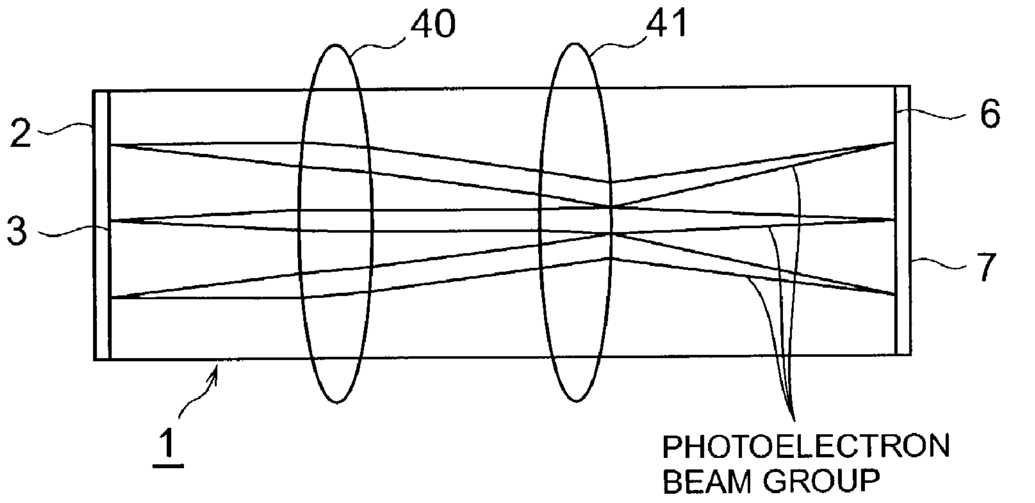
FIG. 4A is a view showing the trajectories of those photoelectron beams, of multi-channel photoelectron beams, which are emitted from fine spots at the end of the photocathode.
Figure 4B:
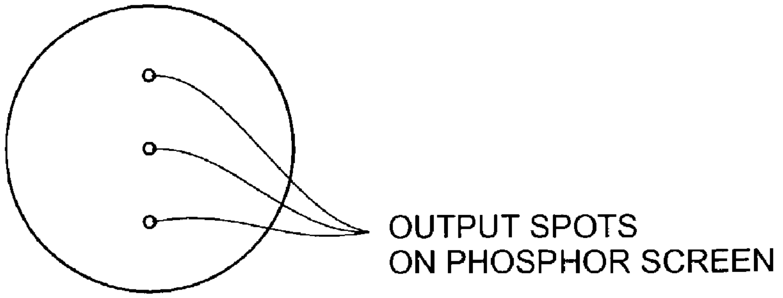
FIG. 4B is a view showing output spots on a fluorescent material.

FIG. 4A is a view showing the trajectories of those photoelectron beams, of multi-channel photoelectron beams, which are emitted from a fine spot at the center of the photocathode 3 and from fine spots at the ends of the photocathode 3 farthest from the center, i.e., at the ends within the effective range in the space domain which are at positions 8 mm from the center of the photocathode 3. FIG. 4B is a view showing output spots on the fluorescent material.

The three electron trajectories shown in FIG. 4A actually rotate around the tube axis at a location where a focusing magnetic field exists in the direction of tube axis. For the sake of descriptive convenience, the trajectories within the plane of rotation are drawn on the same paper sheet. From the relationship of this rotation, regarding the fine spot group formed linearly on the photocathode 3 described above, the inclination of the straight line with respect to the deflecting electrode 5 must be limited. The group of photoelectron beams (only three are shown in FIGS. 4A and 4B) emitted from the respective points that form a straight line are lined up on a straight line on sections at respective positions in the direction of tube axis.

Figure 5:
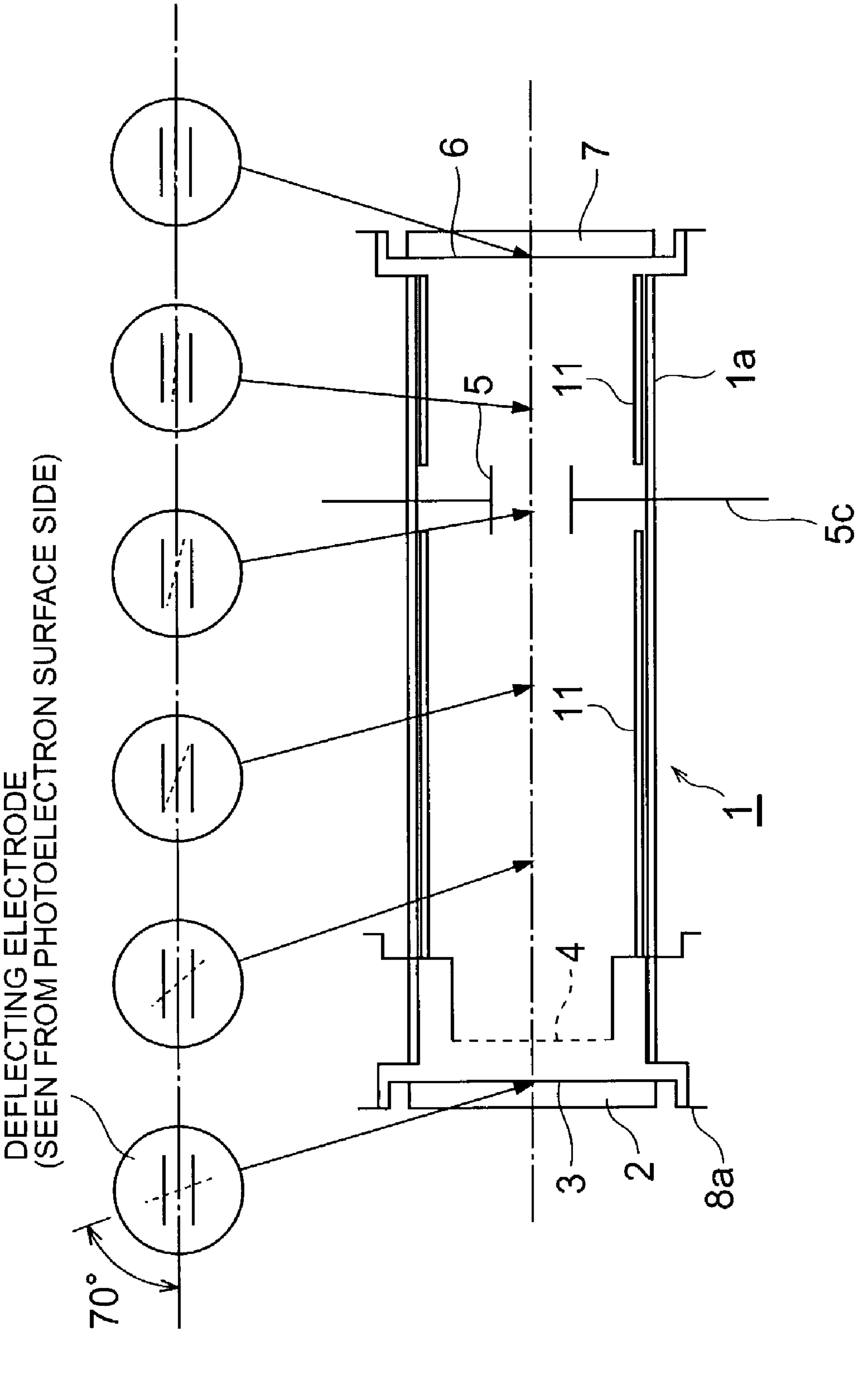
FIG. 5 is a view showing how a photoelectron beam group rotates about the tube axis as the center.

More specifically, referring to FIG. 5, the group of photoelectron beams have the largest inclination in the photocathode 3, and rotate about the tube axis as the center. The closer to the deflecting electrode 5, the more the group of photoelectron beams become parallel to the deflecting plates 5*a* and 5*b*. The inclination of the straight line must be determined in advance on the photocathode 3 so when the group of photoelectron beams become incident on the deflecting electrode 5, they become parallel to the deflecting plates 5*a* and 5*b*. Otherwise, an electron beam of a channel close to the end of the group of the photoelectron beams undesirably collides against the deflecting plate 5*a* or 5*b*, as the gap between the two deflecting plates 5*a* and 5*b* is as small as about 8 mm.

According to the first embodiment, the inclination of the straight line on that plane in the photocathode 3 which is perpendicular to the tube axis is set to about 70° with respect to the deflecting plates 5*a* and 5*b*. Also, after being emitted from the fine spots, the respective photoelectron beams spread due to the initial velocity distribution of the group of photoelectrons that form the beams, but form an image on the fluorescent material 6 again because of the focusing magnetic fields generated by the focusing magnetic flux generators. The gap between the deflecting plates 5*a* and 5*b* is set to as small as about 8 mm in order to obtain a good deflection sensitivity.

In the streak apparatus according to the first embodiment of the present invention, the first focusing magnetic flux generator 12*a* and second focusing magnetic flux generator 12*b* are formed to surround the glass tube 1*a*.

More specifically, according to this streak tube, a streak tube having the pair of deflecting plates 5*a* and 5*b* for deflecting electrons between the photocathode 3 and fluorescent material 6 has a group of electron lenses which form a magnetic field between the photocathode 3 and the deflecting plates 5*a* and 5*b* to focus the electrons emitted from the photocathode 3 to between the deflecting plates 5*a* and 5*b* divisionally in a plurality of steps.

It is the first focusing magnetic flux generator 12*a* that forms the main focusing electron lens which forms photoelectron images of the fine spots on the photocathode 3 onto the fluorescent material 6. The position of the first focusing magnetic flux generator 12*a* in the direction of tube axis is determined in the following manner.

First, the first focusing magnetic flux generator 12*a* is arranged on the photocathode 3 side of the deflecting electrode 5 so no focusing magnetic field substantially acts on the deflecting electrode 5. If a focusing magnetic field is present in the deflecting electrode 5, the photoelectron beams are constrained by the magnetic field to decrease the deflection sensitivity. Then, a large voltage is necessary for sweep. Even if a photoelectron beam with a linear section is caused to become incident on the deflecting electrode 5 to be parallel to the deflecting plates 5*a* and 5*b* at the inlet of the deflecting electrode 5, it moves cycloidally and rotates due to the synergetic effect of the focusing magnetic field and deflecting electric field. Consequently, when the linear electron beam has a large length in the linear direction, it collides against the deflecting plates 5*a* and 5*b*. In order to prevent this, the first focusing magnetic flux generator 12*a* is arranged on the photocathode 3 side of the deflecting electrode 5.

There is another factor that determines the position of the first focusing magnetic flux generator 12*a*, which forms the main focusing electron lens, in the direction of tube axis. It is the enlargement factor of an electron optical system, that is, a scale at which the optical image on the photocathode 3 is enlarged to form an image on the output fluorescent material 6. According to the first embodiment, assume that a fine spot light beam forms an image at the end of the effective range (at a position 8 mm from the center of the photocathode 3) in order to widen the effective range on the photocathode 3. The output image on the fluorescent material 6 corresponding to this spot is formed at a position 8M mm from the center of the fluorescent material 6 where M is the enlargement factor of the electron optical system.

Therefore, the larger the enlargement factor M, the larger the effective diameter of the formation region of the fluorescent material 6 must be. For this reason, the streak tube 1 becomes undesirably large in size. The streak tube 1 according to the first embodiment has the cylindrical glass tube 1*a* as an envelope. When the effective diameter of the fluorescent material 6 becomes larger than the effective range of the photocathode 3, the diameter of the envelope must be increased on the output side, and the structure becomes complicated.

In view of this, according to the first embodiment, the enlargement factor is set to about 1. The enlargement factor of the streak tube 1 is almost equal to (distance between center of main focusing lens and output sweep surface)/(distance between photocathode and center of main focusing electron lens) when the first focusing magnetic flux generator 12*a* is the only focusing magnetic flux generator.

In the streak tube according to the first embodiment, since the prefocus lens formed by the second focusing magnetic flux generator 12*b* is set between the photocathode 3 and first focusing magnetic flux generator 12*a*, the enlargement factor becomes larger than a value obtained by the above equation by several 10ths. In the first embodiment, the ratio of the above equation is set to about 1/1.5, as described above, to obtain an enlargement factor of about 1.

The function of the second focusing magnetic flux generator 12*b* which forms the prefocus lens will be described with reference to FIG. 4. A photoelectron beam emitted from that fine spot in the photocathode 3, which is at the end of the effective range in the space domain and at a position 8 mm from the center of the photocathode 3, is bent by a focus lens 40 and travels toward the center of a main focusing electron lens 41. Since the main focusing electron lens 41 has a small spherical aberration at its center, a spot image with a small blur can be obtained on the output fluorescent material 6. As a result, a good space resolution can be obtained in both the time domain and space domain.

Figure 6A:
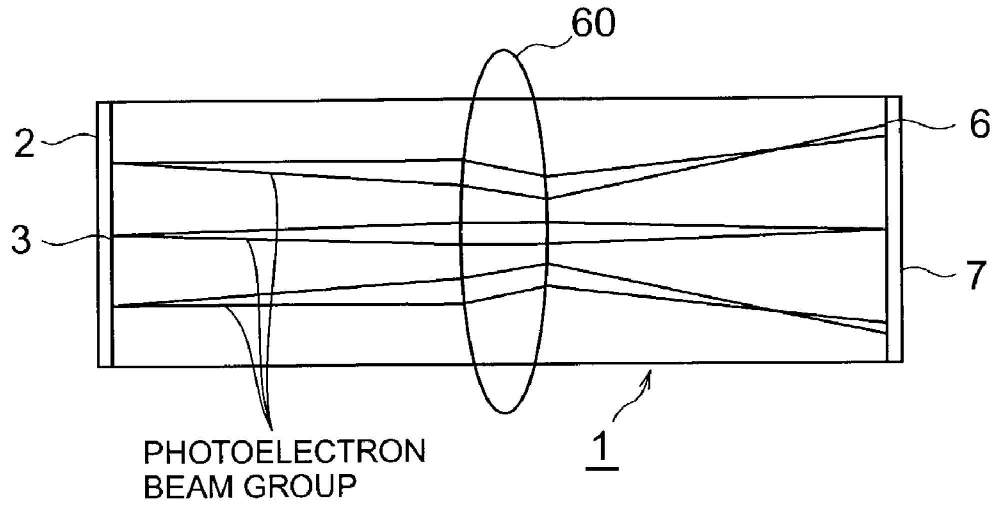
FIG. 6A is a view showing how electron beams form an image on an output fluorescent material in a streak apparatus having only one focusing magnetic flux generator.
Figure 6B:
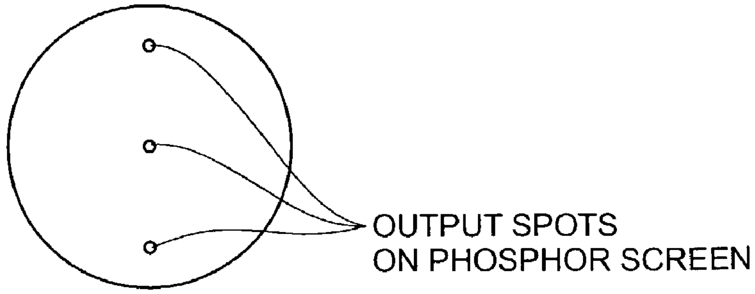
FIG. 6B is a view showing output spots on the fluorescent material.

FIG. 6A is a view showing how electron beams form an image on an output fluorescent material in a streak apparatus having no second focusing magnetic flux generator 12*b* but having only a first focusing magnetic flux generator 12*a*, and FIG. 6B is a view showing output spots on the fluorescent material.

Since a photoelectron emitted from the end of the photocathode 3 is subjected to focusing by that peripheral portion of a main focusing electron lens 60 which has a large spherical aberration, the beam largely blurs on the output surface, and the space resolution is degraded.

Figure 7A:
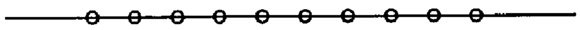
FIG. 7A is a view showing an image obtained on the output fluorescent material in a non-sweep mode with a prefocus lens when a group of multi-channel fine spots form images on a photocathode at equal intervals.
Figure 7B:
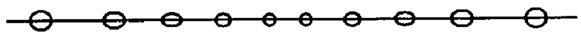
FIG. 7B is a view showing an image obtained on the output fluorescent material in the non-sweep mode without a prefocus lens when a group of multi-channel fine spots form images on the photocathode at equal intervals.

FIGS. 7A and 7B show images obtained on the fluorescent material 6 in a non-sweep mode when the group of multichannel fine spots form images at equal intervals on the photocathode. FIG. 7A shows a case with a prefocus lens, and FIG. 7B shows a case without a prefocus lens. Obviously, with a prefocus lens, the space distortion can be decreased more.

In the streak apparatus according to the first embodiment of the present invention, (2) a high D-range is obtained in the sweep operation of resolving in time. This will be described by using electron trajectories and the like.

Figure 8:
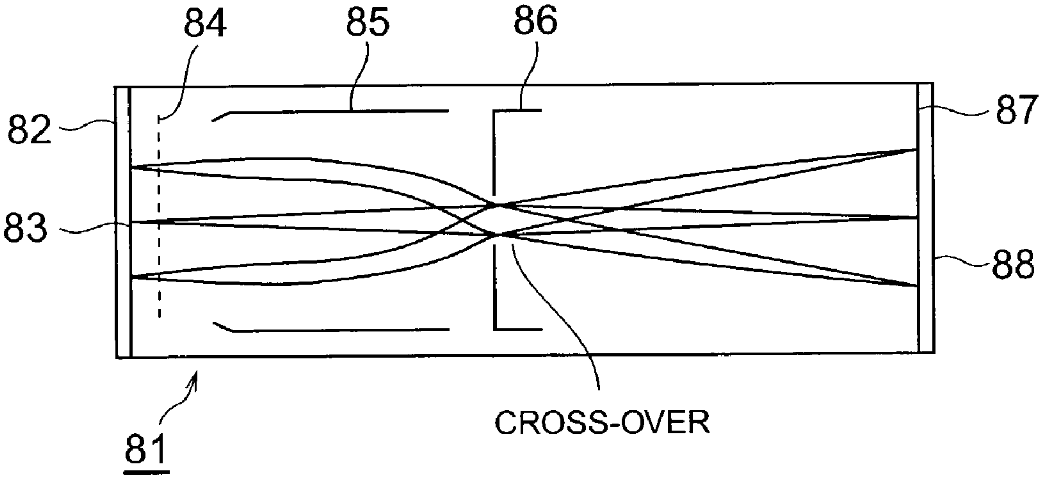
FIG. 8 is a view showing, when multi-channel simultaneous time resolution photometry is performed by using an electrostatic focusing streak tube, electron trajectories in the tube.

FIG. 8 is a view showing, when multi-channel simultaneous time resolution photometry is performed by using an electrostatic focusing streak tube 81, electron trajectories in the tube. Light which has become incident through an input window 82 is converted into photoelectrons by a photocathode 83. The photoelectrons are accelerated by an accelerating electrode 84 and focused by a focusing cathode 85 to become incident in an anode 86. After that, the photoelectrons form an image on a fluorescent material 87. The fluorescent material 87 is attached to the inner surface of an output window 88. In this case, photoelectron beams emitted from a plurality of fine spots on the photocathode 83 which correspond to the respective channels intersect at a point called cross-over.

Accordingly, at this point and in its vicinity, when the quantity of light increases, the density of photoelectrons increases greatly, so the photoelectrons react each other due to the space charge effect. Consequently, the image of the electron beams which is formed on the fluorescent material 87 blurs, and the time resolution is degraded.

In contrast to this, in the case of the electromagnetic focusing streak tube 1 shown in FIG. 4, although the photoelectrons emitted from the respective fine spots are gathered in the vicinity of the center of the main focusing electron lens 41, they do not intersect at one point as in the electrostatic focusing streak tube shown in FIG. 8. Therefore, the density of photoelectrons is greatly smaller than that in the electrostatic focusing streak tube even at a portion where the density becomes maximum in the direction of tube axis. Therefore, the D-range degradation caused by the space charge effect decreases.

The density of photoelectrons becomes maximum in the vicinity of the exit surface of the main focusing electron lens 41, as shown in FIG. 4. In this streak tube 1, since the main focusing electron lens 41 is set at a portion closer to the output side than the center of the streak tube, as described above, the distance from a portion where the photoelectron density becomes a maximum to the output sweep surface becomes small. Even when the Coulomb repulsive force caused by the space charge effect works at the maximum-density portion, the degree of diffusion of the photoelectron beams caused by it is small. As a result, the D-range degradation can be decreased.

Figure 9:
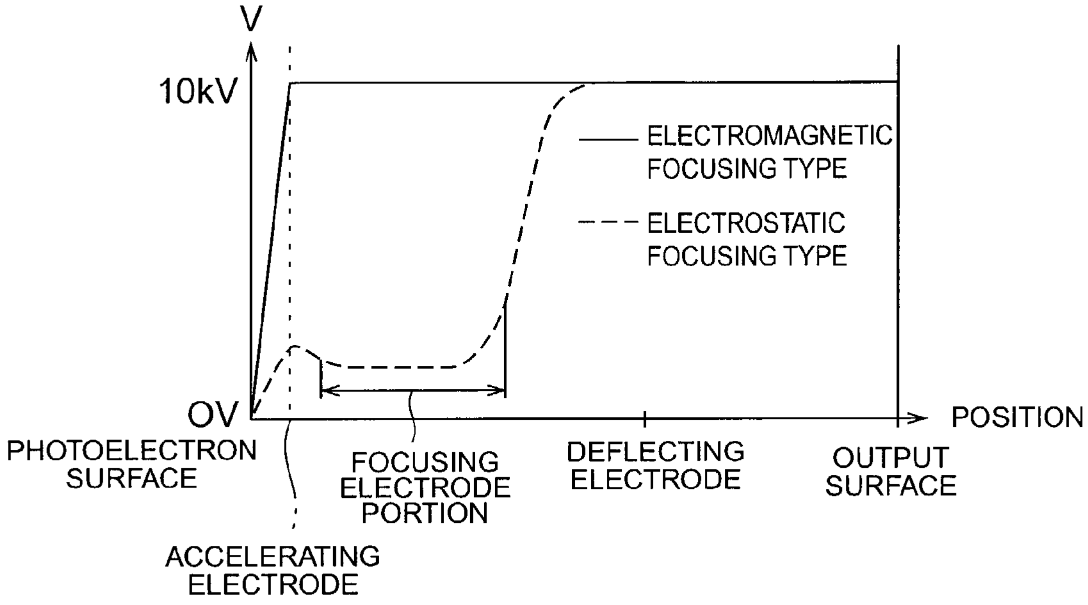
FIG. 9 is a graph showing the potential distribution in the direction of tube axis of an electromagnetic focusing streak tube according to the first embodiment of the present invention in comparison with that in an electrostatic focusing streak tube.

FIG. 9 is a graph showing the potential distribution in the direction of tube axis of the electromagnetic focusing streak tube according to the first embodiment of the present invention in comparison with that in the electrostatic focusing streak tube. In the electrostatic focusing streak tube, as the potential of the focusing electrode portion is set to be lower than that of the accelerating electrode, the focusing electrode portion becomes a low-velocity region in the direction of tube axis. The influence of the space charge effect of the group of photoelectrons which form the photoelectron beams increases.

Accordingly, the electron beams blur more largely on the fluorescent material, and the D-range narrows. In contrast to this, in the electromagnetic focusing streak tube, the photoelectrons emitted from the photocathode are immediately accelerated to 10 kev by the accelerating electrode opposing the photocathode. Hence, the influence of the space charge effect can be decreased, and the D-range can be widened.

Figure 10:
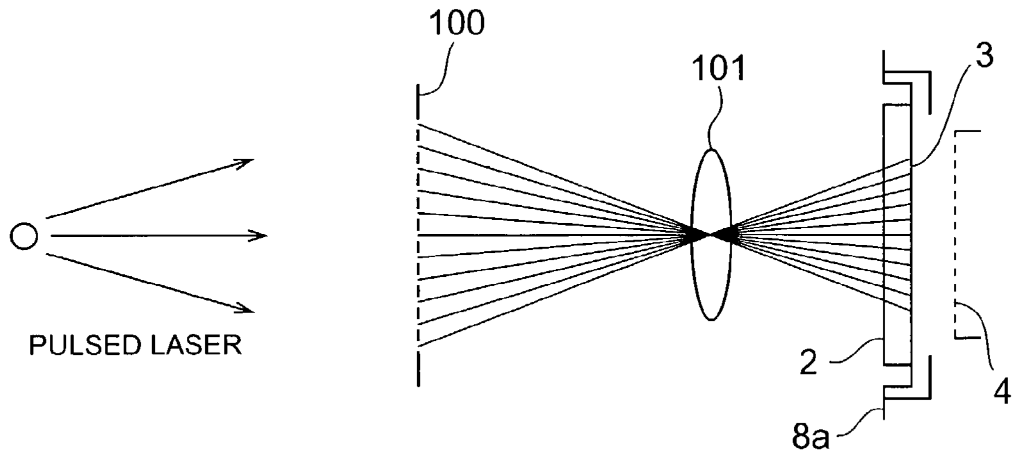
FIG. 10 is a view showing evaluation of a D-range obtained when the streak tube according to the first embodiment of the present invention is used for multi-channel simultaneous time resolution measurement.

The D-range of a case wherein the streak tube according to the first embodiment is to be utilized for multi-channel simultaneous time resolution measurement was evaluated by an arrangement as shown in FIG. 10. More specifically, a black sheet 100 having a row of 11 100-μm diameter pinholes at a 1.6-mm pitch is irradiated with a pulsed laser with a time width of 30 ps. The pinhole row forms an image on a photocathode 3 of the streak tube through an optical relay lens 101 with an enlargement factor of 1:1. Accordingly, the distance between the two ends of the spot group formed on the photocathode 3 is 16 mm.

The plurality of photoelectron beams emitted from the spot group on the photocathode 3 form an image again on the fluorescent material with an enlargement factor of 1 through the focusing magnetic flux generators, and is swept by a sweep electrode, so a streak image is obtained. When the half width of the brightness distribution in the sweep direction is divided by the sweep velocity, time resolution is obtained.

Figure 11:
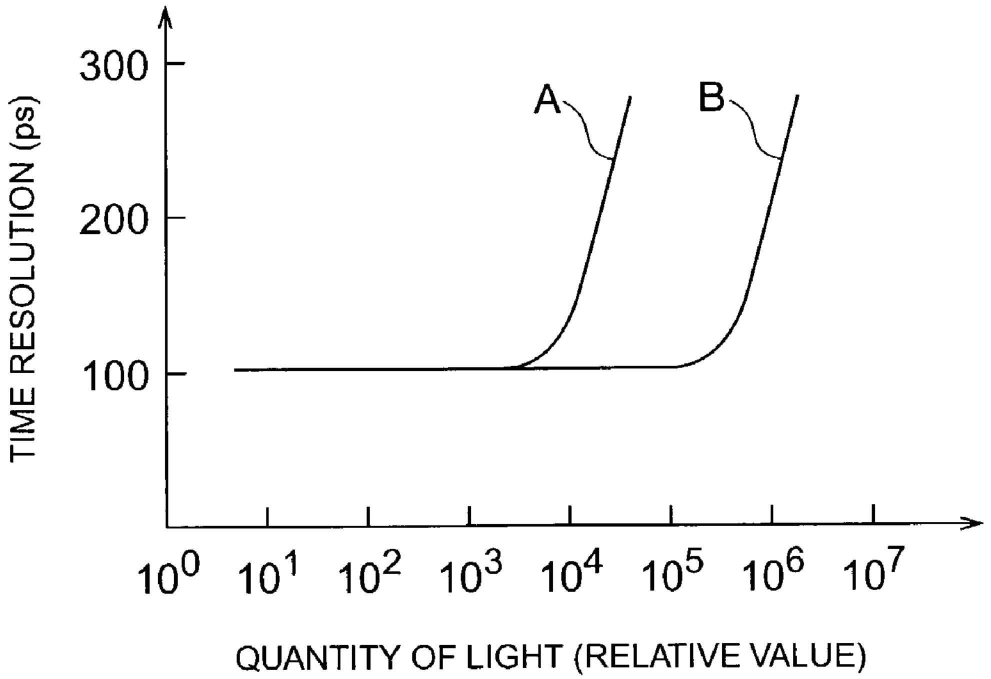
FIG. 11 is a graph showing time resolution B of the streak tube according to the first embodiment of the present invention in comparison with time resolution A of a conventional electrostatic focusing streak tube.

FIG. 11 is a graph showing time resolution B of the streak tube according to the first embodiment in comparison with time resolution A of a conventional electrostatic focusing streak tube. When the brightness of the optical pulse increases, the time resolution is degraded. In the streak tube according to the first embodiment, the quantity of light where the degradation occurs is larger than that in the electrostatic focusing streak tube, and the D-range is improved greatly.

(Second Embodiment)

A streak apparatus according to the second embodiment of the present invention will be described. According to the first embodiment, the first focusing magnetic flux generator 12*a* is arranged on the photocathode 3 side of the deflecting electrode 5 so no focusing magnetic field substantially acts on the deflecting electrode 5. Still, the magnetic field does have an influence on the deflecting electrode 5, so the deflection sensitivity decreases, and the photoelectron beams rotate to a certain degree in the deflecting electrode 5. In order to decrease the influence of the magnetic field to a negligible degree, according to the second embodiment, the coil is shielded by a magnetic body such as soft iron.

Figure 12:
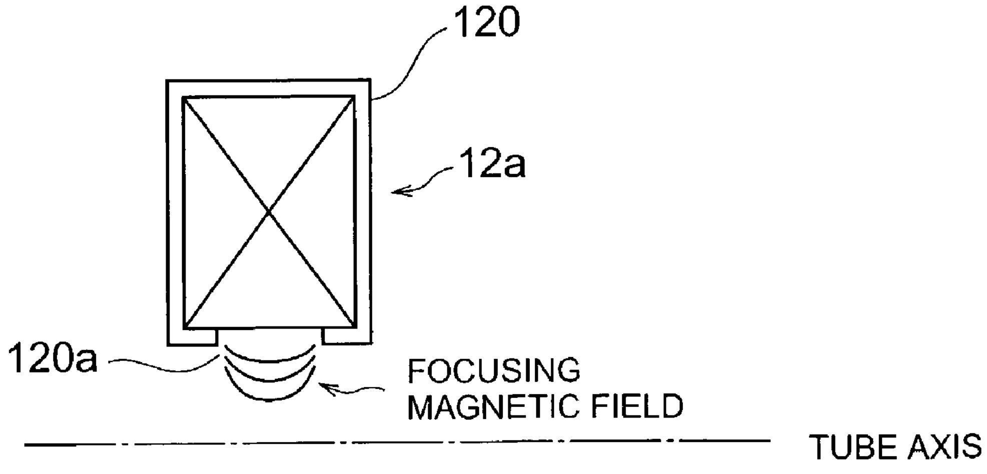
FIG. 12 is a view showing a focusing magnetic flux generator shielded by an iron frame with an aperture on the tube side a streak apparatus according to the second embodiment of the present invention.

FIG. 12 is a view showing a focusing magnetic flux generator 12*a* shielded by an iron frame 120 having an aperture 120*a* on the streak tube side. The focusing magnetic flux enters the streak tube through the aperture 120*a* and performs focusing.

Figure 13:
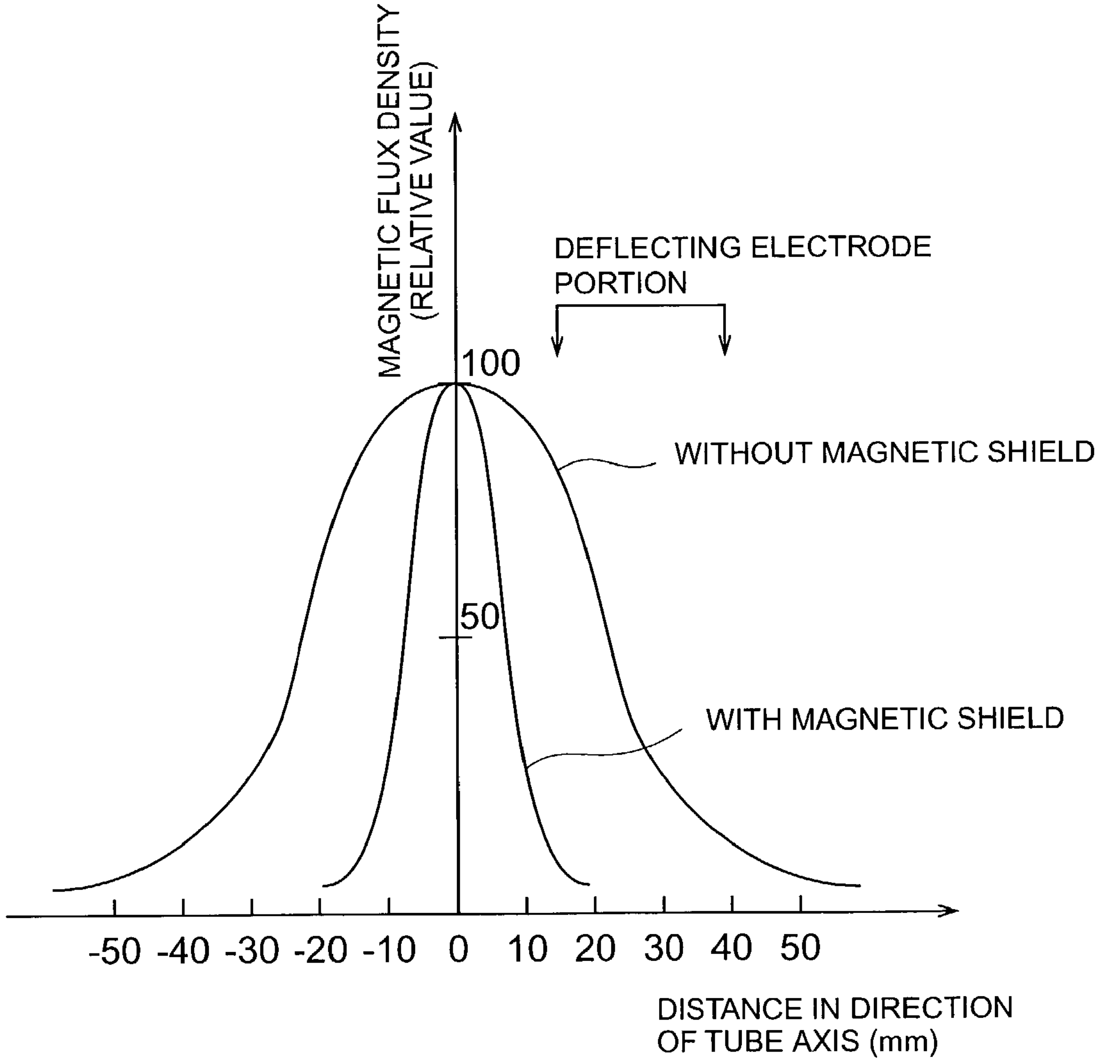
FIG. 13 is a graph showing a magnetic flux density distribution on the tube axis of a case with a magnetic shield and that of a case without a magnetic shield.

FIG. 13 is a graph showing a magnetic flux density distribution on the tube axis of a case with such a magnetic shield and that of a case without such a magnetic shield. As shown in FIG. 13, with a magnetic shield, the peak intensity can attenuate fast to reach a level where penetration of the magnetic field into the deflecting electrode portion can be neglected.

(Third Embodiment)

A streak apparatus according to the third embodiment of the present invention will be described.

Figure 14:
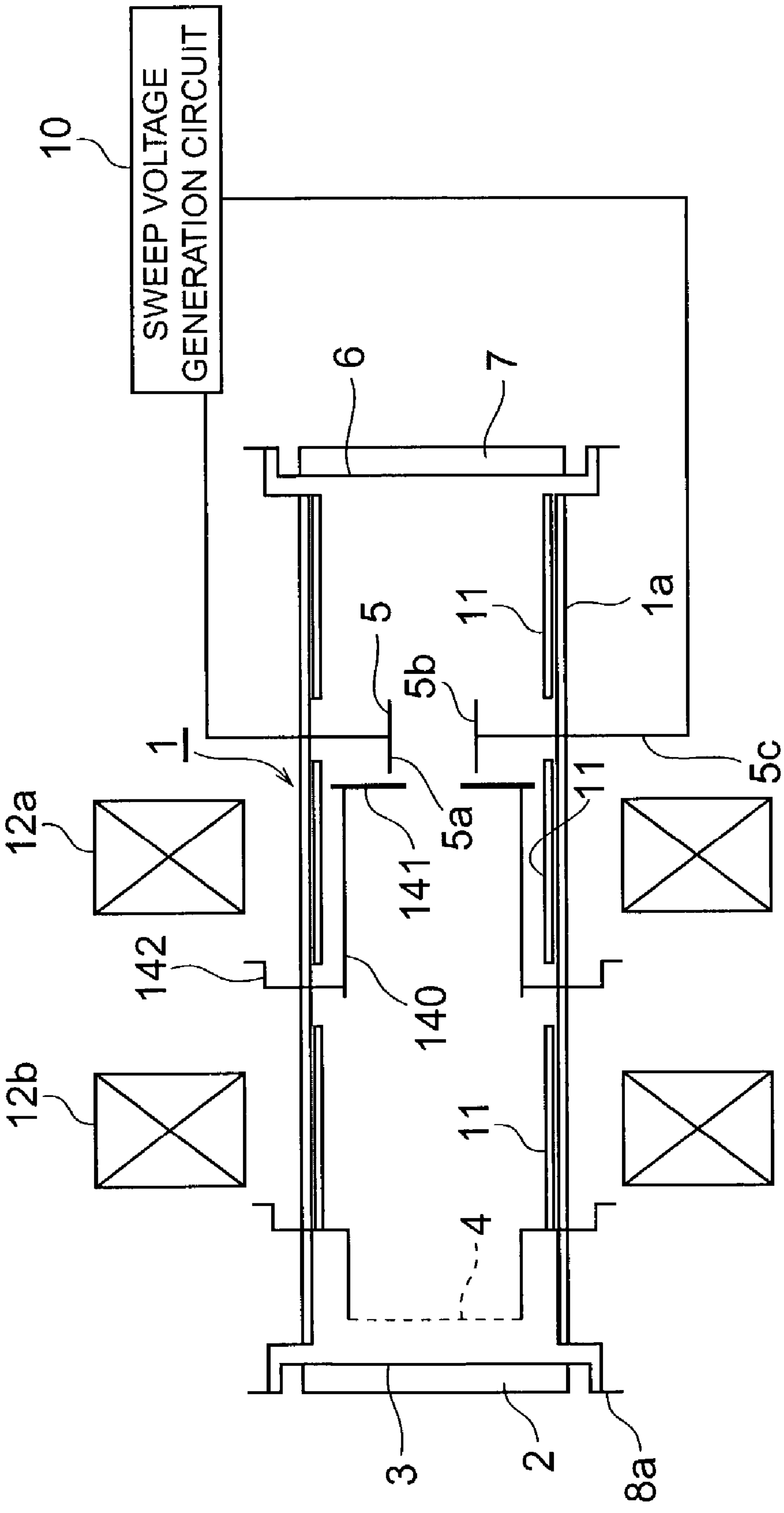
FIG. 14 is a schematic sectional view of a streak apparatus according to the third embodiment of the present invention.

FIG. 14 is a schematic sectional view of a streak apparatus according to the third embodiment of the present invention. When a sweep voltage is applied to deflecting plates 5*a* and 5*b*, strong electric fields occur in the deflecting plates 5*a* and 5*b*. This adversely influences the main focusing magnetic flux region to cause problems such as a decrease in time resolution. In order to prevent this, according to the third embodiment, a shielding plate 141 with an aperture having the tube axis as its center is formed in the vicinity of a deflecting electrode 5 on a photocathode 3 side. The shielding plate 141 is held by a cylindrical electrode 140 fixed to a metal flange 142. The potential of the shielding plate 141 is set to be equal to the potential of an accelerating electrode 4.

When the potential at a portion extending from the cylindrical electrode 140 to a fluorescent material 6 is decreased to be lower than that of the accelerating electrode 4, the deflection sensitivity can be improved. As the metal flange 142 must be fused to a glass tube 1*a*, it is mainly made of a ferromagnetic body. A ferromagnetic body disturbs the focusing magnetic field to cause degradation in resolution or distortion. For this reason, the metal flange 142 is arranged at substantially the middle portion between the first focusing magnetic flux generator 12*a* and a second focusing magnetic flux generator 12*b*.

(Fourth Embodiment)

A streak apparatus according to the fourth embodiment of the present invention will be described.

Figure 15:
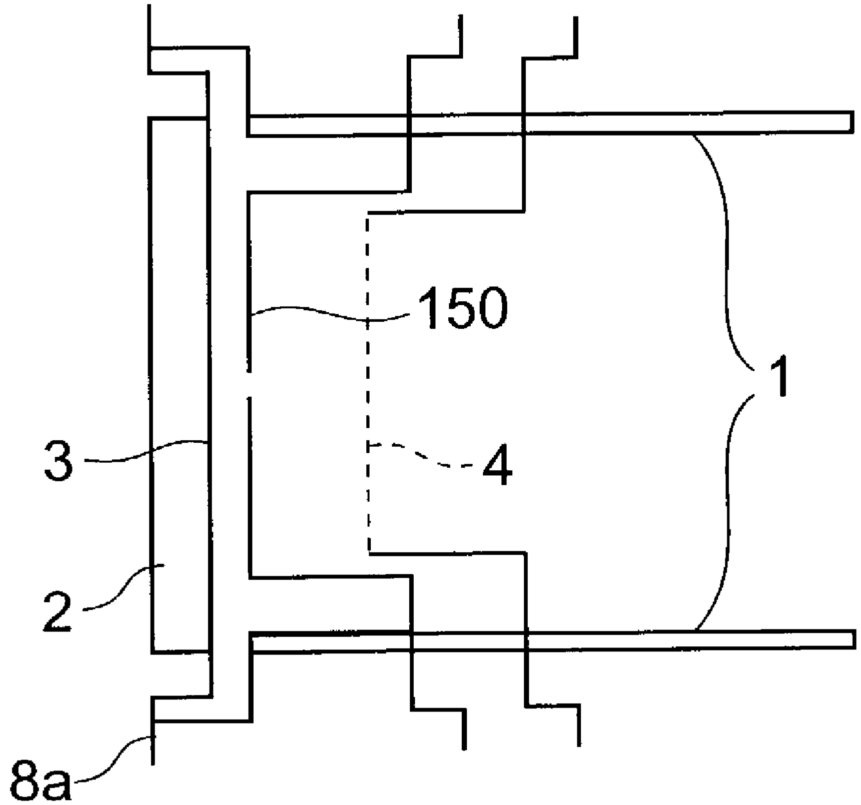
FIG. 15 is a partially sectional view of a portion in the vicinity of a photocathode in a streak apparatus according to the fourth embodiment of the present invention.

FIG. 15 is a partially sectional view of a portion in the vicinity of a photocathode in a streak apparatus according to the fourth embodiment of the present invention. According to the fourth embodiment, a gate electrode 150 having, e.g., a 20-mm length, 1-mm width aperture is arranged between a photocathode 3 and accelerating electrode 4. The gap between the photocathode 3 and gate electrode 150 is 0.5 mm. During streak sweep, a voltage of +200 V is applied to the photocathode 3. Before and after sweep, a voltage of −50 V is applied to the photocathode 3. Thus, while sweep is not being performed, even if light becomes incident on the photocathode 3, an unwanted output image can be prevented from being formed, and an increase in background can be decreased.

In this manner, according to the present invention, a photoelectron beam emitted from the photocathode at the end of its effective range in the space domain is bent by a prefocus lens and travels toward the center of the main focusing electron lens. Since the main focusing electron lens has a small spherical aberration at its center, a spot image with a small blur can be obtained on the output surface. As a result, a good space resolution can be obtained in both the time domain and space domain.

In the embodiments described above, the focusing magnetic flux generators include one that forms a prefocus lens and one that forms a main focusing electron lens. Alternatively, a plurality of focusing magnetic flux generators may be used to form each lens. For example, if a prefocus lens is formed of two focusing magnetic flux generators, the trajectories of photoelectron beams can be controlled in a finer manner, and the space distortion and ambient space resolution characteristics can be improved.

The fluorescent material is used as the output surface where the photoelectron beams are swept and the photoelectron images are converted into visible optical images. A microchannel plate (MCP) with an electron multiplication function may be arranged before the output surface. In place of the microchannel plate, an electron-bombardment image-sensing element may be used. The accelerating electrode is described as a mesh electrode, but it may be a plate-like electrode having an aperture.

As is apparent from the above description, according to the present invention, a photoelectron beam emitted from the photocathode at the end of its effective range in the space domain is bent by a prefocus lens and travels toward the center of the main focusing electron lens. Since the main focusing electron lens has a small spherical aberration at its center, a spot image with a small blur can be obtained on the output surface. As a result, a good space resolution can be obtained in both the time domain and space domain. In the electromagnetic focusing streak apparatus, since the position of the main focusing electron lens is set close to the output surface side (fluorescent material side), the influence of the space charge effect can be decreased, and high D-range characteristics can be obtained.

INDUSTRIAL APPLICABILITY

The apparatus according to the present invention can be utilized as a streak apparatus.

The invention claimed is:

1. A streak apparatus comprising:

a streak tube having:

a vacuum container which has, at one end thereof, a photocathode for converting a received light beam into photoelectrons and, at the other end thereof, an output surface for converting an image formed by the photoelectrons into a visible optical image, an accelerating electrode arranged to oppose said photocathode along a tube axis of said vacuum container and to accelerate the photoelectrons emitted from said photocathode, a deflecting electrode formed of a pair of electrodes opposing each other between said accelerating electrode and said output surface to sandwich the tube axis, and a plurality of focusing magnetic flux generators for generating a focusing magnetic flux between said photocathode and an incident port of said deflecting electrode to focus the photoelectrons emitted from said photocathode;

a deflecting voltage generation circuit for supplying a voltage to said deflecting electrode so as to generate a deflecting electric field;

an acceleration voltage generation circuit for supplying a voltage to said accelerating electrode; and a drive power supply for supplying a current to said focusing magnetic flux generators, wherein, said plurality of focusing magnetic flux generators form a main focusing electron lens for forming an electron image, formed on said photocathode, on said output surface, a prefocus lens arranged between said photocathode and said main focusing electron lens to focus the photoelectrons, emitted from said photocathode, toward a center of said main focusing electron lens; and said prefocus lens surrounds the tube axis.

2. A streak apparatus comprising:

a streak tube having:

a vacuum container which has, at one end thereof, a photocathode for converting received light into photoelectrons and, at the other end thereof, an output surface for converting an image formed by the photoelectrons into a visible optical image, an accelerating electrode arranged to oppose said photocathode along a tube axis of said vacuum container and to accelerate the photoelectrons emitted from said photocathode, a deflecting electrode formed of a pair of electrodes opposing each other between said accelerating electrode and said output surface to sandwich the tube axis, and a plurality of focusing magnetic flux generators including a permanent magnet and serving to generate a magnetic flux, by said permanent magnet, between said photocathode and an incident port of said deflecting electrode to focus the photoelectrons emitted from said photocathode;

a deflecting voltage generation circuit for supplying a voltage to said deflecting electrode so as to generate a deflecting electric field; and an acceleration voltage generation circuit for supplying a voltage to said accelerating electrode, wherein, said plurality of focusing magnetic flux generators form a main focusing electron lens for forming an electron image, formed on said photocathode, on said output surface, a prefocus lens arranged between said photocathode and said main focusing electron lens to focus the photoelectrons, emitted from said photocathode, toward a center of said main focusing electron lens, said prefocus lens surrounds the tube axis.

3. A streak apparatus according to claim 1, characterized in that a distance between the center of said main focusing electron lens and said output surface is set to be smaller than a distance between said photocathode and the center of said main focusing electron lens.

4. A streak apparatus according to claim 1, characterized in that each of said focusing magnetic flux generators has a coil arranged to surround said vacuum container and having a central axis coinciding with the tube axis, a magnetic body for shielding said coil, and an aperture formed in said magnetic body on a vacuum container side.

5. A streak apparatus according to claim 2, characterized in that each of said focusing magnetic flux generators has a coil arranged to surround said vacuum container and having a central axis coinciding with the tube axis, a magnetic body for shielding said coil, and an aperture formed in said magnetic body on a vacuum container side.

6. A streak apparatus according to claim 1, characterized in that said streak tube has a first focusing magnetic flux generator for forming said main focusing electron lens, and a second focusing magnetic flux generator for forming said prefocus lens.

7. A streak apparatus according to claim 2, characterized in that said streak tube has a first focusing magnetic flux generator for forming said main focusing electron lens, and a second focusing magnetic flux generator for forming said prefocus lens.

8. A streak apparatus comprising:

a streak tube having:

a vacuum container which has, at one end thereof, a photocathode for converting a received light beam into photoelectrons and, at the other end thereof, an output surface for converting an image formed by the photoelectrons into a visible optical image, an accelerating electrode arranged to oppose said photocathode along a tube axis of said vacuum container and to accelerate the photoelectrons emitted from said photocathode, a deflecting electrode formed of a pair of electrodes opposing each other between said accelerating electrode and said output surface to sandwich the tube axis, and a plurality of focusing magnetic flux generators for generating a focusing magnetic flux between said photocathode and an incident port of said deflecting electrode to focus the photoelectrons emitted from said photocathode;

a deflecting voltage generation circuit for supplying a voltage to said deflecting electrode so as to generate a deflecting electric field;

an acceleration voltage generation circuit for supplying a voltage to said accelerating electrode; and a drive power supply for supplying a current to said focusing magnetic flux generators, wherein, said plurality of focusing magnetic flux generators form a main focusing electron lens for forming an electron image, formed on said photocathode, on said output surface, a prefocus lens arranged between said photocathode and said main focusing electron lens to focus the photoelectrons, emitted from said photocathode, toward a center of said main focusing electron lens, and said streak tube has a shielding plate arranged in the vicinity of the incident port of said deflecting electrode to shield an electric field leaking from said deflecting electrode and to have an aperture having the tube axis as a center thereof, said shielding plate having a potential set to not more than a potential of said accelerating electrode.

9. A streak apparatus comprising:

a streak tube having:

a vacuum container which has, at one end thereof, a photocathode for converting received light into photoelectrons and, at the other end thereof, an output surface for converting an image formed by the photoelectrons into a visible optical image, an accelerating electrode arranged to oppose said photocathode along a tube axis of said vacuum container and to accelerate the photoelectrons emitted from said photocathode, a deflecting electrode formed of a pair of electrodes opposing each other between said accelerating electrode and said output surface to sandwich the tube axis, and a plurality of focusing magnetic flux generators including a permanent magnet and serving to generate a magnetic flux, by said permanent magnet, between said photocathode and an incident port of said deflecting electrode to focus the photoelectrons emitted from said photocathode;

a deflecting voltage generation circuit for supplying a voltage to said deflecting electrode so as to generate a deflecting electric field; and an acceleration voltage generation circuit for supplying a voltage to said accelerating electrode, wherein, said plurality of focusing magnetic flux generators form a main focusing electron lens for forming an electron image, formed on said photocathode, on said output surface, a prefocus lens arranged between said photocathode and said main focusing electron lens to focus the photoelectrons, emitted from said photocathode, toward a center of said main focusing electron lens, and said streak tube has a shielding plate arranged in the vicinity of the incident port of said deflecting electrode to shield an electric field leaking from said deflecting electrode and to have an aperture having the tube axis as a center thereof, said shielding plate having a potential set to not more than a potential of said accelerating electrode.

10. A streak apparatus according to claim 8, characterized in that said streak tube further has a flange arranged at a middle portion between two adjacent magnetic flux generators to support said shielding plate and to be electrically connected to said shielding plate.

11. A streak apparatus according to claim 9, characterized in that said streak tube further has a flange arranged at a middle portion between two adjacent magnetic flux generators to support said shielding plate and to be electrically connected to said shielding plate.

12. A streak apparatus according to claim 1, characterized in that said streak tube further has a gate electrode between said photocathode and said accelerating electrode to have an aperture having the tube axis as a center thereof.

13. A streak tube comprising a pair of deflecting plates for deflecting electrons between a photocathode and fluorescent material, characterized by comprising an electron lens group which forms a magnetic field between said photocathode and said deflecting plates so as to focus the electrons emitted from said photocathode to between said deflecting plates divisionally in a plurality of steps.

14. A streak apparatus according to claim 1, wherein said main focusing electron lens surrounds the tube axis.

15. A streak apparatus according to claim 1, wherein said prefocus lens has a coil surrounding the tube axis.

16. A streak apparatus according to claim 1, wherein said prefocus lens is arranged so as to rotate the generated photoelectrons around the tube axis at a location where a focusing magnetic field exists in the direction of tube axis.

17. A streak apparatus according to claim 2, wherein said main focusing electron lens surrounds the tube axis.

18. A streak apparatus according to claim 2, wherein said prefocus lens is arranged so as to rotate the generated photoelectrons around the tube axis at a location where a focusing magnetic field exists in the direction of tube axis.

19. A streak apparatus according to claim 1, wherein the magnetic field formed by said prefocus lens is symmetrical about the tube axis.

* * * * *